United States Patent
Palluel

[15] 3,673,137

[45] June 27, 1972

[54] COATING COMPOSITIONS

[72] Inventor: Auguste Louis Luciene Palluel, Windsor, England

[73] Assignee: Imperial Chemical Industries Limited, London, England

[22] Filed: Dec. 9, 1969

[21] Appl. No.: 875,066

Related U.S. Application Data

[63] Continuation of Ser. No. 624,128, March 20, 1967, abandoned.

[30] Foreign Application Priority Data

March 25, 1966 Great Britain ...................... 13,323/66

[52] U.S. Cl. ............................. 260/19, 260/29.3, 260/45.9, 260/842, 260/844
[51] Int. Cl. .......................................................... C08g 5/20
[58] Field of Search .................. 260/19, 842, 844, 29.3, 45.9

[56] References Cited

UNITED STATES PATENTS

| | | | |
|---|---|---|---|
| 2,890,095 | 6/1959 | Meister et al. | 260/51.5 |
| 3,230,162 | 1/1966 | Gilchrist | 260/29.3 |
| 3,351,575 | 11/1967 | Gilchrist | 260/844 |
| R25,213 | 7/1962 | Runk et al. | 260/20 |

*Primary Examiner*—Donald E. Czaja
*Assistant Examiner*—William E. Parker
*Attorney*—Cushman, Darby & Cushman

[57] ABSTRACT

A coating composition capable of being crosslinked on a substrate to which it is applied which contains an acidic film-forming material containing at least two carboxyl groups and a phenolic material containing at least two 47 groups —$CH_2.NR_1R_2$ substituted in positions ortho and/or para to one or more phenolic hydroxy groups, $R_1$ and $R_2$ being alkyl or substituted alkyl groups.

13 Claims, No Drawings

COATING COMPOSITIONS

This application is a continuation of Ser. No. 624,128 filed Mar. 20, 1967, now abandoned.

BACKGROUND OF INVENTION

This invention relates to crosslinkable coating compositions which contain an acidic film-forming material and a phenolic material.

It is well established that certain film-forming materials may be modified by crosslinking chemical groups within the material so that they become, for example, insoluble in common solvents and resistant to chemical attack. When these materials are employed in coating compositions it is convenient to apply them to a substrate as a solution or as a dispersion in a suitable liquid medium and subsequently modify them on the substrate by crosslinking. The modification may be achieved for example, by the direct crosslinking of groups in the material or through a crosslinking agent which contains chemical groups reactive towards certain chemical groups in the film-forming material.

SUMMARY

We have now found that certain acidic film-forming materials may be crosslinked by certain phenolic materials and that a combination of these two types of material is suitable in a crosslinkable coating composition.

DESCRIPTION OF PREFERRED EMBODIMENTS

According to the present invention we provide a coating composition which comprises an acidic film-forming material containing at least two carboxyl groups per molecule and a phenolic material containing at least two groups —$CH_2.NR_1R_2$ per molecule substituted in positions ortho and/or para to one or more phenolic hydroxy groups, wherein $R_1$ and $R_2$ are alkyl or substituted alkyl groups, the same or different.

The coating compositions of this invention may be applied by conventional processes to a substrate from any suitable aqueous or non-aqueous medium in which the components can be dissolved or dispersed. The acidic film-forming material may be crosslinked during or after application, for example, by heating.

The compositions are particularly suitable for application from an aqueous medium since the carboxyl groups of the film-forming material enable it to be dissolved or dispersed in such medium, normally in the presence of a base.

Suitable acidic film-forming materials include:

1. Materials containing a maleinised drying oil fatty acid ester such as the maleinised drying oils, for example maleinised dehydrated castor oil, maleinised soya bean oil, maleinised linseed oil, and fumarised tung oil; the products obtained by reacting maleinised drying oil fatty acids with suitable hydroxyl-containing bodies such as polyols in which term we include the epoxy resins; and the products obtained by reacting maleic anhydride with esterified drying oil fatty acids.

2. Addition copolymers in which one of the polymerized co-monomers contains a carboxyl group, for example a copolymer of an alkyl acrylate and/or an alkyl methacrylate and acrylic acid in which there are at least two carboxyl groups per molecule. Suitable carboxyl-containing co-monomers include acrylic acid, methacrylic acid and maleic anhydride, and suitable monomers polymerizable therewith include, for example, methyl methacrylate, ethyl acrylate, butyl methacrylate, styrene and vinyl toluene.

3. Alkyd resins which contain free carboxyl groups, for example, those of high acid value based on trimellitic anhydride, a suitable polyol such as pentaerythritol and optionally drying oil fatty acids and other acids.

It is understood for the purpose of this invention that a carboxylic acid anhydride group is equivalent to two carboxylic acid groups.

When the coating composition comprises an aqueous medium, the acid value of the acidic film-forming material is preferably greater than 30 mg.KOH/gm.

Suitable bases which may be employed to aid dissolution or dispersion of the acidic film-forming material in an aqueous medium include ammonia and water-soluble organic amines such as diethylamine, triethylamine, diethanolamine and triethanolamine and in certain applications inorganic bases such as sodium and potassium hydroxide.

The phenolic material with which the acidic film-forming material is combined in the present coating compositions contains at least two groups of structure —$CH_2.NR_1R_2$ per molecule which are substituted in one or more aromatic rings and which are activated by a phenolic hydroxy group by virtue of being in an ortho and/or para position to such a group.

The groups $R_1$ and $R_2$ are alkyl or substituted alkyl groups, the same or different, and in general $R_1$ and $R_2$ each contain from one to 18 carbon atoms. Preferably $R_1$ and $R_2$ each contain from one to six carbon atoms but the nature of the alkyl group and substituents therein, will be determined to a large extent by the nature of the medium from which the coating composition is applied. For example when $R_1$ and $R_2$ are lower alkyl groups the phenolic material will be more soluble in polar media, e.g. an aqueous medium, and when $R_1$ and $R_2$ are higher alkyl groups the phenolic material will be more soluble in non-polar media.

Suitable substituents in the alkyl groups include hydroxyl groups.

The phenolic material may contain one or more phenolic residues per molecule and there may be one or more phenolic hydroxy groups in each such residue, for example the phenolic residue may be derived from phenol or resorcinol.

Suitable phenolic materials include for example those obtained by introducing at least two —$CH_2.NR_1R_2$ groups into the positions ortho and/or para to the hydroxy group of phenols such as phenol, resorcinol, p-tertiary butyl phenol, p-octyl phenol, p-phenyl phenol and phenols which contain more than one phenolic residue, for example 2,2'-diphenylol propane.

Particularly preferred phenolic materials are the 2,2'-diphenylol propanes and derivatives thereof having at least two substituents —$CH_2.NR_1R_2$ in positions ortho and/or para to a phenolic hydroxy group.

The number and chemical nature of nuclear substituents other than the —$CH_2.NR_1R_2$ groups on the parent phenol may be selected, according to well known principles, in order to improve compatibility with the acidic film-forming material or solubility in the selected coating composition medium; provided that at least two sites remain available on the phenolic residue or residues ortho or para to a phenolic hydroxy, for at least two of the groups —$CH_2.NR_1R_2$. Alkyl, aryl and aralkyl substituents on the phenol will improve its compatibility with oil modified film-formers and its solubility in hydrocarbon solvents whilst carboxyl, carboxy alkyl and polyethenoxy groups will improve solubility or dispersibility in an aqueous medium.

In order to improve solubility or dispersibility in an aqueous medium hydrophilic groups may also be present as substituents in the alkyl groups $R_1$ $R_2$ of the groups —$CH_2.NR_1R_2$ of the phenolic material and these groups may be varied when introduced for example, by the method herein described for preparing the phenolic materials in which there is employed a secondary amine $NHR_1R_2$. Examples of suitable hydrophilic groups include hydroxy and carboxyl groups. Hydroxy groups, for example, may be introduced by using as the secondary amine, a dihydroxyalkylamine such as diethanolamine. In general there is employed from 0.5 to 50% by weight of the phenolic material based on the total weight of that material and the acidic film-forming material.

The phenolic material is conveniently prepared for example, by reacting a phenol which may comprise one or more phenolic residues with formaldehyde and a secondary amine, $NHR_1R_2$ wherein $R_1$ and $R_2$ are alkyl or substituted alkyl groups the same or different, under the conditions employed in the known Mannich reaction. In general it is necessary to react 1 mole of the phenol with at least 2 moles of formaldehyde, or alternatively with a proportion of a substance which will generate at least 2 moles of formaldehyde, and 2 moles of the secondary amine.

Where convenient the reaction may be carried out in an aqueous medium, but more usually it is carried out in a completely or partially water miscible non-aqueous solvent, for example a lower alcohol or an ether alcohol. Acidic or basic catalysts may be added to the reaction mixture, but more usually the modifying secondary amine provides suitable basic conditions for the reaction. The temperature of reaction is that usually employed for the formation of phenol-formaldehyde condensates; that is from room temperature to about 100° C.

Typical parent phenols which may be employed in the preparation of the phenolic material by this method include for example those already mentioned above. The choice of the phenol will depend particularly upon the nature of the acidic film-forming material which the phenolic material is required to crosslink and upon the medium from which the composition is to be applied.

In the secondary amine $NHR_1R_2$ the groups $R_1$ and $R_2$ are alkyl or substituted alkyl groups, particular groups being chosen in general to facilitate the use of the phenolic material in various media. In general the alkyl groups $R_1$ and $R_2$ may each contain from one to 18 carbon atoms, but preferably from one to six carbon atoms. Typical amines which are suitable include dimethylamine, diethylamine, diethanolamine, dicyclohexylamine and morpholine.

The present coating compositions may be applied to a variety of substrates such as metal, wood or hardboard, by a variety of processes from an aqueous or non-aqueous medium. In addition to the acidic film-forming material and the phenolic material there may be present in the composition other acidic or non-acidic film-forming materials and other materials conventionally used in coating compositions for example pigments, fillers, extenders, surfactants and thickeners.

When applied from an aqueous medium the phenolic material and the acidic film-forming material are preferably water-soluble or water-dispersible and suitable methods of application from an aqueous medium include for example, brushing, spraying, dipping, or electrodeposition. After application of the composition to a substrate the acidic film-forming material is normally cross-linked by the phenolic material. Crosslinking is usually effected by stoving at a suitable temperature, for example in the range 120°–200° C, depending on the nature of the substrate and the material to be crosslinked.

It is preferred that there is present in the aqueous medium a water miscible organic liquid for example the monobutyl ether of ethylene glycol and other monoaklyl ethers of ethylene glycol, and butanol.

The present compositions are particularly suitable for application to an article by a process of electrodeposition in which an electric current is passed through an aqueous medium containing a solution and/or a dispersion of a composition according to the invention in the presence of a base between the article and another electrode immersed in the medium.

In such a process the phenolic material may advantageously contain at least one carboxyl group to assist in its deposition upon the article in a required proportion relative to that of the acidic film-forming material. Such a carboxyl group may be introduced by a procedure analogous with that described above, for example by condensing an amino carboxylic acid or a derivative thereof in the presence of formaldehyde with at least one phenolic residue to effect substitution in a position ortho and/or para to a phenolic hydroxy group.

The phenolic materials may be combined with a wide range of acidic film-forming materials for application by the electrodeposition process when these materials are soluble and/or dispersible in water or an aqueous medium. Typical acidic resins which are soluble or dispersible in water in the presence of a base and which are suitable in electrodeposition are those already referred to above. Suitable bases which may be used to solubilize or disperse the acidic film-forming material for electrodeposition include ammonia and the water-soluble organic amines and inorganic bases such as sodium and potassium hydroxide. It is preferred in the electrodeposition process to employ from 0.5 to 40% by weight of the phenolic material based on the total weight of agent and film-forming resin.

The invention is illustrated by the following Examples in which parts and precentages are by weight unless otherwise stated.

EXAMPLE 1

1 mole proportion of diphenylol propane was dissolved with warming in 4 mole proportions of diethanolamine (88% solution in water); to this solution were added 4 mole proportions of formaldehyde (37% in water) and reaction allowed to proceed at 90° C. until no further increase in viscosity was observed. The product could be diluted with water.

An aqueous solution of the phenolic product was blended with the following film-forming materials in a solids ratio phenolic product to film-forming material of 40 to 60 by weight. (a) A solution of a maleinised bodied linseed oil (in which maleic anhydride had been reacted with bodied linseed oil in a molar ratio of 2 to 1) neutralized with ammonia; (b) a solution of fumarised tung oil (in which fumaric acid had been initially reacted with tung oil in a molar ratio of 2 to 1) neutralized with ammonia.

Typical metal paint primers were made from these blends pigmented with barytes and red iron oxide in the respective weight ratio of 3 to 1 the pigment to binder volume ratio being 3:7, and the resulting paints applied by spraying to steel panels and stoved for 30 minutes at 165° C. In both cases, the hardness and the observed corrosion resistance of the coated panels were superior to similar panels obtained by applying otherwise identical pigmented primers but in which the phenolic product was omitted.

EXAMPLE 2

1,368 parts of diphenylol propane were dissolved with warming in 1,368 parts of butanol; to the clear solution was added a solution of 225 parts of glycine in 486 parts of 37% aqueous formaldehyde. The mixture was heated at about 95° C for 1½ hours when 95.5% of the formaldehyde had reacted.

To the resulting product was further added 1,094 parts of diethylamine followed by 905 parts of a 40% solution of formaldehyde in butanol. The reaction mixture was kept at 94° C for 2 hours 50 minutes when 98.8% of the formaldehyde had reacted.

The final phenolic product was readily dispersed in water to give a dispersion of pH 10, and was completely soluble in dilute aqueous acid.

The final phenolic product dispersed in water was mixed with the following conventional water dispersible electrophoretic film-forming primers, pigmented with red iron oxide in a pigment to binder volume ratio of 1:19, in a solids ratio phenolic product to film-forming primer of 20 to 80 by weight;

a. maleinised linseed oil, in which linseed oil had been reacted with maleic anhydride in a molar ratio of 1 to 2 and neutralized with diethanolamine so that the pH of the mixture was 7.8, b. a trimellitic alkyd prepared from 2.21 parts trimellitic anhydride, 1.91 parts trimethylol ethane, 1.8 parts benzyl alcohol, 1 part glycerine, 3 parts soya bean oil fatty acids and 0.45 parts benzoic acid, and neutralized with triethylamine so that the pH of the mixture was 7.8–8, c. an epoxy ester prepared by reacting an epoxy resin (derived from diphenylol propane and epichlorhydrin and of molecular weight 1,400) with dehydrated castor oil fatty acid and maleinised linseed oil fatty acid to give an acid value of 85 mg. KOH/gm, and neutralized with diethanolamine so that the mixture had a pH 7.8.

These composite paints and otherwise identical paints but which which did not contain the phenolic product were electro-deposited onto pretreated panels to give a film thickness of 0.8 thou., stoved at 165° C and subjected to the ASTM "salt spray" test for 250 hours. In each case the panels obtained from the paints containing the phenolic product showed improved performance over the otherwise identical paints from which the phenolic product had been omitted.

EXAMPLE 3

100 parts of diphenylol propane were dissolved in a mixture of 152 parts morpholine and 52 parts of butyl cellosolve. To this solution 131 parts of a 40 part solution of formaldehyde in butanol were added and reaction continued at 90° C until all the formaldehyde had reacted.

The phenolic product was soluble in alcoholic solvents and in dilute aqueous acids. When employed in paint primers similar to those of Example 1 spray coated steel panels showed improved resistance to corrosion over primers which did not contain the phenolic product.

I claim:

1. An aqueous alkaline coating composition which comprises a simple admixture of (a) an acidic film-forming material containing at least two carboxyl groups per molecule and (b) a phenolic material containing one or two phenolic residues and at least two groups —$CH_2 \cdot NR_1R_2$ per molecule substituted in positions selected from the group consisting of ortho and para to at least one phenolic hydroxy group wherein $R_1$ and $R_2$ are each selected from the class consisting of alkyl and substituted alkyl groups having one to 18 carbon atoms each, said film-forming material being cross-linkable by said phenolic material upon heating.

2. A coating composition according to claim 1 wherein the acidic film-forming material contains a maleinized drying oil fatty acid ester.

3. A coating composition according to claim 1 wherein the acidic film-forming material is an addition copolymer wherein one polymerized comonomer contains a carboxyl group.

4. An aqueous alkaline coating composition which comprises a simple admixture of (a) an acidic film-forming material containing at least two free carboxyl groups per molecule and which is an alkyd resin and (b) a phenolic material containing one or two phenolic residues and at least two groups —$CH_2 \cdot NR_1R_2$ per molecule substituted in positions selected from the group consisting of ortho and para to at least one phenolic hydroxy group wherein $R_1$ and $R_2$ are each selected from the class consisting of alkyl and substituted alkyl groups having one to 18 carbon atoms each, said film-forming material being crosslinkable by said phenolic material upon heating.

5. A coating composition according to claim 1 wherein the film-forming material has an acid value greater than 30 mg. KOH/gm.

6. A coating composition according to claim 1 wherein $R_1$ and $R_2$ each contain from one to six carbon atoms.

7. A coating composition according to claim 1 wherein one of the groups $R_1$ and $R_2$ contains a hydroxy substituent.

8. A coating composition according to claim 1 wherein the phenolic material is 2,2'-diphenylol propane having at least two substituents —$CH_2 \cdot NR_1R_2$ in positions selected from the group consisting of ortho and/para to a phenolic hydroxy group.

9. A coating composition according to claim 1 wherein there is present from 0.5 to 50% by weight of the phenolic material based on the total weight of phenol material and acidic film-forming material.

10. A coating composition as set forth in claim 1 in which said acidic film-forming material and said phenolic material are dispersed in an aqueous medium in the presence of a water-soluble base selected from the group consisting of ammonia, diethyl amine, triethylamine, diethanolamine, triethanolamine, sodium hydroxide and potassium hydroxide.

11. A coating composition according to claim 10 wherein the phenolic material contains at least one carboxyl group.

12. A coating composition according to claim 10 wherein there is present from 0.5 to 40% by weight of phenolic material based on the total weight of phenolic material and acidic film-forming material.

13. A coating composition according to claim 10 wherein there is present a water-miscible organic liquid.

* * * * *